United States Patent
Kaltenbach et al.

(10) Patent No.: US 8,535,202 B2
(45) Date of Patent: Sep. 17, 2013

(54) METHOD AND DEVICE FOR OPERATING A HYBRID DRIVE OF A VEHICLE

(75) Inventors: Johannes Kaltenbach, Friedrichshafen (DE); Stefan Wallner, Mattsee (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 490 days.

(21) Appl. No.: 12/808,644

(22) PCT Filed: Dec. 2, 2008

(86) PCT No.: PCT/EP2008/066597
§ 371 (c)(1), (2), (4) Date: Jun. 16, 2010

(87) PCT Pub. No.: WO2009/077319
PCT Pub. Date: Jun. 25, 2009

(65) Prior Publication Data
US 2010/0292046 A1    Nov. 18, 2010

(30) Foreign Application Priority Data
Dec. 17, 2007 (DE) .......................... 10 2007 055 827

(51) Int. Cl.
*B60W 10/02* (2006.01)
*B60W 10/06* (2006.01)
*B60W 10/08* (2006.01)
*B60W 10/10* (2012.01)

(52) U.S. Cl.
USPC .............................................. 477/5

(58) Field of Classification Search
USPC ............................. 475/5, 167, 180
See application file for complete search history.

(56) References Cited

U.S. PATENT DOCUMENTS

| | | |
|---|---|---|
| 7,644,790 B2 | 1/2010 | Roske et al. |
| 2005/0221947 A1 | 10/2005 | Mesiti et al. |
| 2008/0064561 A1* | 3/2008 | Popp et al. .................. 477/5 |
| 2008/0096717 A1* | 4/2008 | Houle et al. ................. 477/5 |
| 2009/0037060 A1 | 2/2009 | Carlhammar et al. |

FOREIGN PATENT DOCUMENTS

| | | |
|---|---|---|
| DE | 102005051382 A1 | 5/2007 |
| EP | 1450037 A1 | 8/2004 |
| WO | WO 2007/102762 A1 | 9/2007 |

OTHER PUBLICATIONS

International Search Report for International Application No. PCT/EP2008/066597, dated May 8, 2009, 2 pages.
Written Opinion of the International Searching Authority for International Application No. PCT/EP2008/066597, dated May 8, 2009, 6 pages.
International Preliminary Report on Patentability for International Application No. PCT/EP2008/066597, dated Jul. 6, 2010, 7 pages.

* cited by examiner

*Primary Examiner* — Edwin A Young
(74) *Attorney, Agent, or Firm* — Brinks Hofer Gilson & Lione

(57) ABSTRACT

A method and a device for operating a hybrid drive of a vehicle includes a parallel hybrid drive train having an internal combustion engine, at least one electric machine, a shift element interposed between the internal combustion engine and the electrical machine, a automatic transmission, and a power take-off. The internal combustion engine is frictionally connected to the electrical machine via the shift element and may be started by the electric machine. A coordinated sequence of functions with defined intermediate states is called up. A state of the shift element for the synchronization of a transmission input of the transmission to a target transmission input speed is varied once the engine has been started. The synchronization is performed either purely with an electromotive force or with a force produced by a combination of the electrical machine and the internal combustion engine.

13 Claims, 1 Drawing Sheet

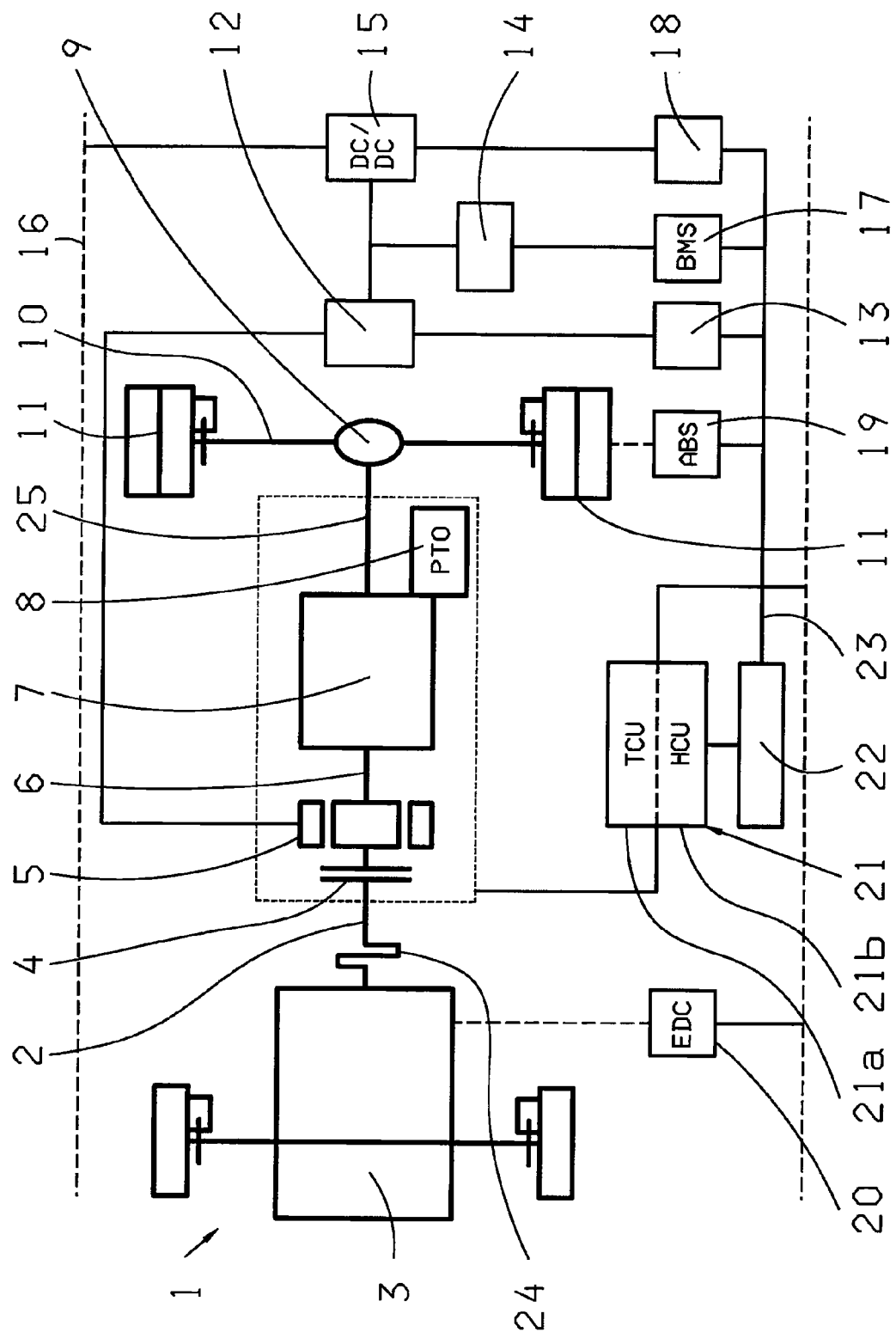

METHOD AND DEVICE FOR OPERATING A HYBRID DRIVE OF A VEHICLE

This application is a filing under 35 U.S.C. §371 of International Patent Application PCT/EP2008/066597, filed Dec. 2, 2008, which claims priority to German Application No. 10 2007 055 827.0, filed Dec. 17, 2007, each of which is incorporated by reference herein in its entirety.

The invention relates to a method and an apparatus for operating a hybrid vehicle according to the preamble of claim 1 or of the patent claim 11.

Hybrid drives in vehicle increasingly gain in importance due to their potential to reduce emissions and energy consumption. Such vehicles have different power sources, but it is in particular various combinations of internal-combustion engines and electric motors that are advantageous, because on the one hand they use the range and performance advantages of internal-combustion engines and, on the other, the flexible applications of electrical machines as a sole or auxiliary power source or as a starter generator and a generator to produce electricity and to recuperate energy.

The market demands such hybrid power trains that can be implemented into vehicles, possibly without any additional space requirements, while minimizing the complexity and doing so at low cost and design development effort. We basically distinguish two hybrid topologies: the series hybrid and the parallel hybrid arrangement. Such arrangements are already known and are being constantly further developed.

In the series hybrid, drive units are connected in series. In this arrangement, it is the internal-combustion engine, such as a diesel engine, that drives a generator, which in turn feeds an electric machine. Therefore, solely the electric machine drives the vehicle. The internal-combustion engine, however, is decoupled from the drive wheels and can, therefore, be always run at a single operating point, i.e., at a certain torque and a constant rotational speed. This drive concept is suitable, for example, for buses operated in small-distance rides in urban areas, which are preferably set to an operating point, at which the efficiency of the combustion engine is as high as possible while emissions, fuel consumption and noise all lie in a favorable range. However, the series hybrid is adversely affected by the fact that the efficiency of the drive is limited due to the multiple mechanical-electrical energy conversion.

In contrast, due to a parallel arrangement of the power flow, parallel hybrid powertrains offer—in addition to the superposition of the driving torques, that is a hybrid drive—also the option to be driven purely by the internal-combustion engine or purely by the electric motor drive. From the functional point of view, in a parallel hybrid, the combustion engine can be operated largely with optimum torque due to the load and support by one or more of electrical machines so that the point of maximum efficiency of the combustion engine can effectively be used. The electrical assistance to the combustion engine reduces on average fuel consumption. Since during short-term increased power demands in the so called boost mode, for example, when overtaking other vehicles, a summation of the drive power is possible, the internal-combustion engine can be designed relatively small and of low weight, which allows space-saving installation, with almost no loss of the vehicle's performance and driving comfort, with the implications of curbing emission levels and cost. The electric machine can also act as an integrated starter generator (ISG) to start the internal-combustion engine via a coupling. Furthermore, the electric motor can be used in generator mode to charge an electrical energy storage device and can be used for energy recuperation during braking. In principle, all types of vehicle transmissions can be considered as a transmission to vary the gear ratio of the drive of the driven axles.

In a parallel hybrid drive, in practical operation, depending on the driving patterns of a particular operating strategy, one can change the type of drive of the vehicle between the internal-combustion engine drive, the electric motor drive and the mixed drive. In the all-electric driving, the electric machine is connected to the output, while the combustion engine is decoupled from the powertrain by a separation component. If in this situation, the electric motor is to function as an integrated starter generator to start the combustion engine, the combustion engine is again connected by the separator component. In principle, such an engine start can occur both during a change of the gear ration and outside of the gear changing process and both with and without torque interruption. Various suitable startup modes are described in another patent application filed by the applicant.

The alternating connection of the electric motor and the combustion engine in the parallel hybrid powertrain is mostly realized by means of clutches. Essentially, we distinguish a two-clutch arrangement (2K) and a 1-clutch arrangement (1K), where in both arrangements the electric motor as an integrated starter generator (2KISG or 1 K-ISG arrangements). In a 2K-ISG powertrain, the combustion engine can be connected by a first clutch to the electric motor. The electric motor in turn can be connected by a second clutch to a vehicle transmission. In a 1 K-ISG powertrain, however, the second separate clutch between the electric motor and the transmission or the output is eliminated. The electric machine can then be directly connected to a transmission input.

Where envisaged or required in the respective drive concept, the function of an optional second clutch between the electric motor and the output may be assumed by internal transmission clutches and/or switching brakes, as they built, for example, in automatic transmissions, or by an appropriate direct drive clutch technically arranged upstream.

To complete the topic, it should be mentioned at this point that, as an alternative to a direct arrangement, the electric motor could be coupled into the powertrain between the combustion engine and the vehicle transmission or into a direct positive connection by a clutch, also by a suitable additional transmission, such as a planetary gear. The electric machine can then be used in particular as an electro-dynamic starting component (EDA), which may eliminate a conventional starting clutch. Such a hybrid system with a EDA, for example, in conjunction with the automated AS Tronic transmission is known from the production program of the applicant and can be used particularly advantageously in commercial vehicles and buses in urban distribution operations or in the carriage of passengers with frequent start-up, braking and maneuvers.

The starts of the combustion machine from electric hybrid drive are of special significance, because they are relevant, on the one hand, for the ride and, on the other, for the driving dynamics of the hybrid drive. In addition, they also play an important role in the economy and the efficiency of the hybrid drive. The gear-changing strategy and the hybrid operation strategy can be correlated with each other so that relatively frequently a switchgear requirement coincides with an engine start requirement, or that the start of the combustion engine is advantageously associated with a change of gear.

A hybrid drive with a two-clutch arrangement and a stepped transmission is known from the US 2005 0221947 A1. This publication describes a start/stop function, in which the combustion engine is switched off and restarted by an electric machine. In a stop step, at the occurrence of a predetermined stop condition, such as when slowing down at a traffic light or in dense traffic, the combustion engine is separated from the powertrain by a clutch on the combustion engine side. In the following start step, first the electric machine drives the vehicle with the first gear ratio engaged. After that, at the occurrence of predetermined operating conditions, the gear ratio is changed (increased), while simultaneously separating the electric motor from the transmission by a clutch on the transmission side and the combustion engine side clutch is engaged so that the combustion engine is started by the electrical machine. After the start, the combustion engine is connected to the transmission by the transmission side clutch so that the internal-combustion engine drives the vehicle alone or in combination with the electric motor. Any shock loads in the powertrain caused by the start-up process that affect the comfort can be largely avoided, because the when the engine is being started, the output is disconnected from the combustion engine by the second clutch.

The disadvantage of this arrangement is the complex control system, in particular the coordination of the two clutches, which are switched in rapid succession or in part simultaneously. Due to variable factors, such as temperature fluctuations in the transmission and the wear and tear condition of the clutches or the lash of components in the mechanical transmission chain in the powertrain as well due to the dependency on current operating conditions of the vehicle, such as acceleration or road gradient, the control system requires a relatively costly regulation and sensors in order to ensure proper hybrid operation.

DE 102005051 382 A1 describes a starting process for starting the engine with a one-clutch arrangement, with the transmission preferably designed as an automatic powershift transmission, that is a transmission that sustains the pulling force of the powertrain. This one clutch can be designed as a frictional clutch or, in the simplest case, as a particularly cost-effective and space-saving form-fitting clutch. To start the internal-combustion engine, the transmission is initially in a neutral position or is switched to a neutral position. In the neutral position, the previously open clutch is triggered for closing so that the electric motor exerts a positive torque to the combustion engine in its intended direction of rotation and the combustion engine is started. Due to the neutral position of the transmission, during the starting process the internal-combustion engine is decoupled from the output of the transmission so that any motor start-related shocks in the powertrain are avoided, which is why the start-up process during the gear changing is relatively comfortable. If one subsequently wishes a purely electrical drive by the electrical machine, for example, for a starting process in a start/stop mode, the clutch can again be completely opened and the speed of the electric machine can be controlled to reach an appropriate connection speed of up the gear to be engaged, for example the $1^{st}$ gear, while the combustion engine runs idle without load.

This document shows a way to comfortably start the combustion engine by means of an electric motor in a hybrid drive with only one clutch, thereby significantly simplifying the cost of control. It is therefore in a position to completely fulfill the underlying task. The main aspect is an automatic start operation within a start-stop system. However, a person skilled in the art finds here no explicit references to the starting process of the combustion engine by an electric drive during a gear change with a pulling force interrupting switching automatic transmission.

Such a hybrid powertrain with a pulling-force interrupting automated transmission switching in a single-clutch arrangement, it is desirable and advantageous to start the combustion engine preferably in the "pulling force interrupted" period in the change of gear. These are, however, alternating dynamic states in a short sequence, which in certain circumstances can cause control problems and an increased susceptibility to failure cannot be easily ruled out.

In particular, within such a combined start/gear-switching operation the following measures should be coordinated:

The engine start can only be initiated from the point in time, from which on the transmission is in neutral or no longer transmits any traction. Furthermore, the drive torque that causes torque, which counteracts the control elements when setting the gear, must be lowered in order for the currently engaged gear to function. In addition, a switching time of the transmission, a start time of the combustion engine, a necessary starting speed and possibly different speed development of the combustion engine, the electric motor and the transmission must be taken account as well. Before the engagement of a planned gear ratio after the start of the combustion engine, finally the transmission input must be synchronized with the connecting rotational speed of the new gear.

Against this background, the technical task underlying the invention is to provide a method and an apparatus for operating a hybrid drive with an internal-combustion engine, an electric machine and an automated manual transmission, which allow, in the most simple and convenient way, to start the combustion engine during the switching process while in electric traction, as well as its coupling to the powertrain, and still ensure a high reliability and resilience to failure of the hybrid drive.

The solution of this problem is obvious from the features of the independent claims, whereas advantageous embodiments and further developments of the invention can be found in the subsidiary claims.

The invention is based on the recognition that a parallel hybrid powertrain with a combined starting/gear-changing process to start the combustion engine with electric drive and to perform a gear change with interruption of traction, due to a co-ordinated triggering of the individual functions to be carried out, when in each case defined intermediate states are achieved, allows to create a particularly robust and reliable hybrid.

According to the features of claim 1, the invention is based on a method for operating a hybrid drive of a vehicle, comprising a parallel hybrid powertrain, an internal-combustion engine, at least one electric machine, a switching element arranged between the combustion engine and the electric motor, a propulsive-force-interrupting switching automated transmission and an output, where the internal-combustion engine can be connected by the switching element to the electrical machine in a non-positive connection and can be started using the electric machine.

Under an automated transmission we understand with propulsive-force-interrupting switching operations, where appropriate actuating elements to engage and disengage the gear ratios are automatically controlled.

Under a switching element for connecting the combustion engine and the electric motor we understand all kinds of automatically controlled elements, by which the internal-combustion engine and the electric motor can be connected. This can be, for example, an electric-hydraulic or electro-pneumatically actuated friction starting clutch or separating clutch.

Under a gear-change in an automated transmission we understand a propulsive force-interrupting gear-change operation, in which the original gear is disengaged and a target gear is engaged. Basically, this also includes the special case of a transmission operation, in which an original gear (engaged gear) and a target gear (gear to be engaged) are the same, which means that a switching operation occurs without changing the gear ratio.

Basically, the invention can be used in all types of vehicles with such parallel hybrid powertrain.

To solve the set technical task, the invention provides that, at a request for starting the engine with propulsive force-interrupting transmission, a coordinated sequence of functions with defined intermediate states is triggered, where a gear-ratio state of the switching element for alternating pure electric or electric-internal-combustion engine synchronization of a transmission input is varied to a target transmission input speed following the engine start.

Furthermore, the problem is solved by a device for carrying out the method. As for this device, the invention continues to be based on the device for operating a hybrid drive of a vehicle, comprising a parallel hybrid powertrain, an internal-combustion engine, at least one electric machine, a switching element arranged between the combustion engine and the electric motor, a propulsive force-interrupting switching automated transmission and an output, where the internal-combustion engine can be connected by the switching element to the electrical machine in a non-positive connection and can be started using the electric machine. In addition, control means are provided by which at a request for starting the engine with propulsive force-interrupting transmission, a coordinated sequence of functions with defined intermediate states is triggered, where a gear-ratio state of the switching element for alternating pure electric or electric-internal-combustion engine synchronization of a transmission input is varied.

Because the individual function commands are invoked sequentially with defined intermediate states, the various dynamic conditions with a simultaneous motor start and gear change can be safely and reliably coordinated so that in every driving situation, the proper switching between the modes of the parallel hybrid in conjunction with the gear ratio change are ensured. Such complex and sensitive interactions of various powertrain components with changing dynamic and kinetic relations in a short time sequence, which due to external influences are difficult to predict and can hardly be predetermined, and therefore can cause a relatively high susceptibility to failure, they are largely avoided or at least substantially reduced in the whole process so that a robust, relatively easy controllable hybrid system can be made available.

In this arrangement, it is particularly advantageous to provide a division of the individual functions into a hybrid control unit and a transmission control unit within a control device that communicates with a strategy unit. In particular, the processes can be relatively easily broken down and then represented in software as individual function to be used, when the individual functions can be evoked depending on the particular sequence. This allows to significantly simplify the relatively complex function sequence in a combined engine start/change of gear process.

According to the invention, in any relevant sequence section of the control, a particular switch position of the switch element for coupling the internal-combustion engine to the powertrain can be ensured or triggered. First, the engine start occurs definitely in the switching pause of the change of gear, which allows to avoid malfunctions in the powertrain due to the motor start. Second, it has been found to be particularly advantageous in the inventive control sequence that after the engine starts, the necessary synchronization of the transmission input can be handled in a variable fashion. In this arrangement, either, with running internal-combustion engine, the electric machine and the internal-combustion engine can be run in block or in synchronization, or the electric motor first takes over the synchronization and the internal-combustion engine, when requested, can be coupled or connected only after the conclusion of the gear-change.

For this, let's assume that there exists a driving situation, in which the vehicle moves purely with the electric motor drive, that is with an open switching element and the internal-combustion engine being at standstill. A hybrid control strategy then issues the command that the internal-combustion engine is to be started, for example, at low state of charge of a drive energy storage device, low electrical drive torque reserve, increased power requirements, etc. The start request for starting the internal-combustion engine can also be given directly by the driver, for example, when guessing by the perceived traffic situation, he considers it appropriate or desirable and signals this using a suitable actuating mechanism and an associated sensor accordingly. As a start condition, a minimum starting speed of the electric machine is set, which is required to start the combustion engine. The start request coincides with a gear-change initiated by a switching strategy.

In the implementation of a first embodiment of the method, to start the internal-combustion engine, the switching element is closed and the synchronization of the transmission input occurs after the start of the combustion engine, with the switching element closed by means of the internal-combustion engine and electric motor.

According to this, the following function sequence can be provided in the event of a request for starting the internal-combustion engine and a simultaneous or substantially simultaneous switching request for switching the transmission during an electric ride, with a synchronization of the transmission input after the completed engine start with a closed switching element, wherein after each step, a defined intermediate state is achieved:

Lower the torque,
Ensure that the switching element is open,
The original gear is disengaged with open switching element,
Start the internal-combustion engine with closed switching element using a momentum start
Synchronize the transmission input
Insert the target gear.

A torque reduction in the powertrain during an electric ride, which is required to prepare a change in the gear ratio in the transmission, can occur by controlling the drive torque of the electric machine with an open switching element. Also possible is a torque reduction, which—with a switching element designed as frictional clutch—is performed or supported by means of a temporary partial closure of the switching element, wherein the switching element completely opens again after the completed torque reduction.

At a subsequent momentum start, first with an open switching element a predetermined minimum starting speed is set to the electric motor or the current speed is maintained above the minimum starting speed; then the switching element is closed and finally, the combustion engine is started when it reaches the minimum starting speed (with proper fuel supply and fuel ignition).

In the implementation of a second variant of the method, in order to start the internal-combustion engine, the switching element is closed and, after the completed engine start, re-opens and the synchronization of the transmission takes place by means of the electric machine with an open switching element.

According to this, the following function sequence can be provided in the event of a request for starting the internal-combustion engine and a simultaneous or substantially simultaneous switching request for switching the transmission during an electric ride, with a synchronization of the transmission input with an open switching element, wherein after each step, a defined intermediate state is achieved:

Lower the torque,
Ensure that the switching element is open,
Disengage the original gear with open switching element,
Start the internal-combustion engine with the switching element being closed using a momentum start
Open the switching element,
Synchronize the transmission input
Insert the target gear,
Close the switching element.

This variant can be also used in a starting process, where with the transmission in a neutral position and the vehicle at standstill, the following function sequence with a synchronization of the transmission with an open switching element can be provided:

Start the internal-combustion engine with the switching element being closed using a momentum start
Open the switching element,
Synchronize the transmission input
Insert the target gear,
Close the switching element.

When such a direct start, the vehicle being at a standstill or the electric motor rotating at a speed below a minimum starting speed, the switching element is closed, and then—with the switching element closed—the combustion engine is accelerated by the electrical machine to the pre-determined minimum starting speed, and finally, the combustion engine is started when it reaches the minimum starting speed.

To illustrate the invention, we have attached a drawing of an embodiment to the invention specification. The single FIGURE shows a schematic representation of a hybrid drive vehicle for the implementation of the inventive operating method.

Accordingly, a scheme of a hybrid vehicle drive 1 is represented by a parallel hybrid—the powertrain 2, as for example, it can be provided for a commercial vehicle (truck, bus, van, special vehicle). The powertrain 2 comprises an internal-combustion engine 3, for example a diesel engine with a crankshaft 24 which can be connected, via a switching element 4, to an electric machine 5. The electric motor 5 is coupled to an automated transmission 7 via a transmission input 6. The powertrain 2 shown in FIG. 1 is thus designed as a 1 K-ISG—arrangement, i.e., with a separation clutch or a starting clutch as the switching element 4 for coupling the internal-combustion engine 3 to the powertrain 2 and connecting it to the electric machine 5. A second separate switching element between the electrical machine 5 and the transmission 7 is eliminated. Past the transmission 7, a subsidiary power take-off 8 can be arranged. Over an output 25 and a differential output 9, an output torque of the hybrid drive can be transmitted to a drive axle 10 and then to the drive wheels 11.

Depending on the operating situation, the electric machine 5 can be operated as an electric drive unit or as a generator. For this purpose it is connected to a converter 12, which is controlled by a converter control unit 13. The electrical machine 5 is connected, via the converter 12, with an electrical energy storage drive 14, for example, a 340 V high-voltage battery (supercapacitors are also possible). In electric-motor operation mode, the electric motor 5 is fed energy from the energy storage device 14. In generator operation mode, that is, when the vehicle is driven by the combustion engine 3, and/or in recuperation mode, the energy storage device 14 is charged by the electric motor 5. Furthermore, the electric motor 5 functions as an integrated starter generator (ISG) to start the combustion engine 3. The high-volt circuit of the energy storage device 14 and the connected control units are connected to a vehicle electrical system (24V or 12V) 16 through a bi-directional DC-DC 15. The energy storage device 14 is monitored and controlled by a battery management system (BMS) 17 with respect to its state of charge (SOC). The DC 15 is controlled by a DC control unit 18. Moreover, a control unit 19 is provided for unspecified brake control functions, in particular an anti-lock braking system (ABS) or an electronic braking system (EBS), and another control unit 20 is provided for an electronic diesel control (EDC) of the combustion engine 3 designed as an example as a diesel engine. The various above-mentioned control devices can also be integrated, at least in part, in a single control unit.

Furthermore, an inventive control device 21 is arranged, in which a transmission control unit 21 (TCU) and a hybrid control unit 21*b* (HCU) are integrated to control the powertrain components. The control device 21 contains function sequences in the form of control and/or regulatory programs for a coordinated implementation of engine starts and gear changes. In particular, the transmission control unit 21*a* and the hybrid control unit 21*b* stored a number of individual functions, from which the function sequences can be assembled. To control the drive power distribution and connection and disconnection of the drive units 3, 5, there is provided a central strategy unit 22, which is connected to the control device 21 and the relevant control units 13, 17, 18, 19 over a data bus 23, for example, a CAN bus, and communicates with them.

An inventive method for starting the internal-combustion engine 3 with a propulsive force-interrupting transmission 7, which is feasible with the hybrid drive 1, is based on a process, in which the individual required functions can be evoked in a sequence, where after each step, a defined intermediate state is reached.

In a first variant, in the electric drive operation mode, initially the torque on the transmission input 6 is reduced by a corresponding control of the electric machine 5. Subsequently, by sending appropriate control commands it is ensured that the switching element 4 is opened and the engaged gear is disengaged, wherein in a certain storage space of the control device 21 a bit is set for the state "open the transmission". In the next step, the combustion engine 3 is started by a momentum start. For this purpose, the electric machine 5 is first accelerated to a minimum starting speed and then the switching element 4 is closed. Upon reaching the minimum starting speed and a corresponding combustion engine fuel injection, the combustion engine 3 starts. The output shafts of the combustion engine 3 and the electric machine 5 are now running—with the switching element 4 continuing to be closed—in the block and synchronize the transmission input 6 by means of a correlated rotational speed control to a connection speed for a target gear to be inserted and engaged. After the synchronization, the target gear is inserted. The function sequence is thus complete.

In a second variant of the method according to the invention, after starting the internal-combustion engine 3, the switching element 4 is first opened again so that the transmission input 6 is coupled only with the electric motor 5. Subsequently, the synchronization of the transmission input 6 to the connection speed of the target gear is performed by the electrical machine 5, and when such speed is reached, the target gear is inserted. The vehicle can now be driven solely by the electric motor with the combustion engine 3 running at idle with no load. When the combustion engine 3 is to be added, its speed is adjusted accordingly and the switching element 4 is closed immediately after the insertion of the target gear, i.e., after the completion of the gear-change or to another desired point in time.

LIST OF REFERENCE NUMBERS AND SYMBOLS

1 A hybrid drive
2 Powertrain
3 Combustion engine
4 Switching element
5 Electric machine
6 Transmission input
7 Transmission
8 Power take-off
9 Differential
10 Drive axle
11 Vehicle wheel
12 Converter
13 Converter control unit
14 Electric propulsion energy storage device
15 DC
16 Wiring
17 Battery management system
18 Voltage converter controller
19 Electronic brake control
20 Electronic diesel control
21 Control device
21a Transmission control unit
21b Hybrid control unit
22 Strategy unit
23 Data bus
24 Crankshaft
25 Output
ABS Anti-lock braking system
BMS Battery management system
DC/DC Direct Current converter
EBS Electronic Brake System
EDC Electronic Diesel Control
HCU Hybrid Control Unit
TCU Transmission Control Unit
PTO Power Take-Off

The invention claimed is:

1. A method for operating a hybrid drive of a vehicle comprising:
receiving a request for starting an internal-combustion engine;
reducing a torque transmitted to an automatic transmission by temporary partial closure of a switching element located between the internal-combustion engine and an electric motor;
opening the switching element after the torque has been reduced such that the internal-combustion engine is decoupled from the electric motor;
disengaging the automatic transmission such that the automatic transmission is not transmitting torque to an output of the automatic transmission;
coupling the internal-combustion engine to the electric motor using the switching element;
starting the internal-combustion engine using the electric motor; and
synchronizing a transmission input of the automatic transmission to a target transmission input speed using a force generated by at least the electric motor.

2. The method according to claim 1, wherein the step of synchronizing the transmission comprises synchronizing the transmission input of the automatic transmission to the target transmission input speed using a force generated by the electric motor and the internal-combustion engine.

3. The method according to claim 1, wherein the step of synchronizing the transmission comprises:
decoupling the electric motor from the internal-combustion engine using the switching element; and
synchronizing the transmission input of the automatic transmission to the target transmission input speed using a force generated by the electric motor.

4. The method according to claim 1, further comprising:
lowering the torque provided by the electric motor to the transmission input prior to the step of starting the internal-combustion engine;
confirming that the switching element is in an open state prior to the step of starting the internal-combustion engine and prior to the step of disengaging the automatic transmission, the open state being a state in which the internal-combustion engine is decoupled from the electric motor;
engaging the automatic transmission after synchronizing the transmission;
configuring the switching element to couple the internal-combustion engine and the electric motor following the step of engaging the automatic transmission.

5. The method according to claim 1 further comprising:
engaging the automatic transmission; and
configuring the switching element to couple the internal-combustion engine and the electric motor.

6. The method according to claim 1 wherein the step of reducing the torque comprises partially closing the switching element.

7. The method according to claim 1 wherein the step of reducing the torque comprises temporarily closing the switching element until the torque is lowered to a predetermined amount.

8. The method according to claim 1 further comprising setting a speed of the electric motor to a predetermined minimum starting speed prior to the step of coupling the internal-combustion engine to the electric motor.

9. The method according to claim 1 further comprising setting a speed of the electric motor to a predetermined minimum starting speed after the step of coupling the internal-combustion engine to the electric motor.

10. The method according to claim 1 wherein the switching element is a clutch.

11. An apparatus for operating a hybrid drive of a vehicle, comprising:
an internal-combustion engine;
an electric motor;
a switching element located between the internal-combustion engine and the electric motor;
an automatic transmission having an input and output, the input coupled to the electric motor;
a controller configured to:
receive a request for starting the internal-combustion engine;
reduce a torque transmitted to the automatic transmission by temporary partial closure of the switching element;
open the switching element after the torque has been reduced such that the internal-combustion engine is decoupled from the electric motor;

disengage the automatic transmission such that the automatic transmission is not transmitting torque to the output of the automatic transmission;

couple the internal-combustion engine to the electric motor using the switching element; and start the internal-combustion engine using the electric motor.

12. The apparatus according to claim 11, wherein the controller comprises a hybrid control unit, a transmission control unit; and a strategy unit, and wherein functions of the controller, the hybrid control unit, the transmission control unit, and the strategy unit are communicatively connected with each other.

13. The apparatus according to claim 11, wherein the switching element is a clutch.

* * * * *